United States Patent
Pan et al.

(10) Patent No.: US 7,813,313 B2
(45) Date of Patent: *Oct. 12, 2010

(54) MIMO COMMUNICATION SYSTEM BASED ON RANDOM BEAMFORMING AND ITS USER SCHEDULING METHOD

(75) Inventors: Zhengang Pan, Beijing (CN); Lan Chen, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 1153 days.

This patent is subject to a terminal disclaimer.

(21) Appl. No.: 11/439,763

(22) Filed: May 23, 2006

(65) Prior Publication Data

US 2006/0268769 A1 Nov. 30, 2006

(30) Foreign Application Priority Data

May 24, 2005 (CN) ......................... 2005 1 0071817

(51) Int. Cl.
*H04W 4/00* (2009.01)
(52) U.S. Cl. ................... 370/328; 370/267; 375/347
(58) Field of Classification Search ............. 370/328, 370/267; 375/347
See application file for complete search history.

(56) References Cited

U.S. PATENT DOCUMENTS

| | | | | |
|---|---|---|---|---|
| 2005/0181833 | A1* | 8/2005 | Lee et al. ............. | 455/562.1 |
| 2006/0039312 | A1* | 2/2006 | Walton et al. ............ | 370/319 |
| 2007/0064641 | A1* | 3/2007 | Laroia et al. ............ | 370/320 |

OTHER PUBLICATIONS

Viswanath, Pramod, et al., "Opportunistic Beamforming Using Dumb Antennas", IEEE Transactions on Information Theory, Jun. 2002, pp. 1277-1294, vol. 48, No. 6.
Laroia, Rajiv, et al., "Enhanced Opportunistic Beamforming", IEEE VTC2003, Oct. 2003, pp. 1762-1766, vol. 3.
Chung, Jaehak, et al., "A Random Beamforming Technique in MIMO Systems Exploiting Multiuser Diversity", IEEE Journal on Selected Areas in Communications, Jun. 2003, pp. 848-855, vol. 21, No. 5.

* cited by examiner

*Primary Examiner*—George Eng
*Assistant Examiner*—Muthuswamy G Manoharan
(74) *Attorney, Agent, or Firm*—Blakely, Sokoloff, Taylor & Zafman LLP

(57) ABSTRACT

Embodiments of the present invention provides a MIMO communication system based on random beamforming and its user scheduling method. The system includes: a transmitter that is used to transmit the data frame including at least the channel estimation signal and the user data; and at least one receiver that is used to receive the data frame from the transmitter and to produce the corresponding feedback information and recover the user data. The transmitter produces the scheduling information according to the feedback signal and utilizes the scheduling information to implement adaptive user scheduling. The scheduling information includes the scheduled users, data streams that should be supported by each scheduled user and the transmit beam adopted by each data stream. Embodiments of the present system can schedule the users with fixed number or adaptively according to the instant channel condition as well as different feedback information so that the intelligence of the system control and communication stability can be improved to approach the maximum system capacity.

10 Claims, 11 Drawing Sheets

(a)

(b)

(c)

MIMO COMMUNICATION SYSTEM BASED ON RANDOM BEAMFORMING AND ITS USER SCHEDULING METHOD

PRIORITY

The present application claims priority to and incorporated by reference the corresponding Chinese patent application serial no. 200510071817.9, titled, "A MIMO Communication System Based on Random Beamforming and its User Scheduling Method," filed on May 24, 2005.

BACKGROUND OF THE INVENTION

1. Field of the Invention

The present invention relates to the user scheduling technology of the multiple input multiple output (MIMO) system, especially the MIMO communication system based on random beamforming and its user scheduling method.

2. Description of the Related Art

The future wireless communication system is required to support the extremely high speed data traffic, such as the videoconference, the video-on-demand and the interactive video game, etc. It should support up to 100 Mbps for high mobility traffic and up to 1 Gbps for low mobility or fixed wireless traffic.

The data rate of one wireless channel is equal to the product of its spectrum width and the spectrum efficiency of the adopted technology. In order to improve the data rate, the spectrum width of the channel or the spectrum efficiency of the adopted technology should be improved. However, since the frequency resource is limited, the communication speed cannot be raised by infinitely increasing the spectrum width. Improving the spectrum efficiency of the adopted technology is an optimal solution.

There are generally two methods to improve the spectrum efficiency. One is by the physical layer technologies such as advanced coding technologies and signal processing technologies etc. to improve the link level spectrum efficiency and the other is by high level control to realize more flexible resource allocation to improve the system level spectrum efficiency. MIMO technology and Channel-Aware User Scheduling are the corresponding two methods to realize the aims.

The so-called MIMO technology means that multiple antennas are mounted at both the transmitter and the receiver in a communication system. The MIMO technology also includes that multiple antennas are mounted at either side, i.e., the single input-multiple output (SIMO) and the multiple input-single output (MISO). Different antennas are physically separated, and are generally regarded as introducing an additional signal domain-a space domain, into the communication system.

Although the spatial resource can provide much performance gain, it is difficult to be utilized because of the uncertainty for changing with the object physical condition. A better control technology is essential to better utilize the spatial resource.

Next the user scheduling technology will be discussed. Currently two basic user scheduling technologies are adopted in the wireless communication system. One is Round Robin scheduling, which refers to a process in which channels are allocated to all the users circularly. This method guarantees the delay characteristic and the equitableness between users as a traditional switch does but the performance is not improved. The other is maximum carrier/intertrace (MaxC/I) scheduling (Channel-Aware User Scheduling), which dynamically allocates the right of accessing the channel to the user with the MaxC/I (simply represented as max$|h_k|$) according to the channel fading condition $h_k$ (in single antenna system, it is a complex number scalar quantity) of the user. The performance of the system can be improved greatly and the performance gain through MaxC/I scheduling is called multiuser diversity.

However, since channel user scheduling allocates common channels according to the channel condition, it depends more on the channel condition. The system performance will be greatly reduced in some specific channel conditions.

FIGS. 1($a$) and 1($b$) show the system architecture diagram with one transmitting antenna at the base station (transmitter) and two users (receiver). In the system, channel user scheduling allocates common channels according to the channel condition.

In FIG. 2, (a) show the channel gain when the channel condition is good; (b) shows the channel gain when there is the line of sight (LoS) in the channel; (c) shows the channel gain when the system is in slow fading.

In FIG. 2, curve 1 shows the channel gain curve of user 1 changing with time, curve 2 shows the channel gain curve of user 2 changing with time and the dashed line shows the average channel gain curve of the system changing with time. FIG. 2($a$) shows the system allocates common channels according to the channel gain of user 1 and user 2 at different times; the common channels are allocated to user 1 in interval 0–$t_1$ and to user 2 in interval 0–$t_2$, etc., which are represented respectively by "1" and "2" on time axis. The channel gain of the system is the upper envelopes of curves 1 and 2, and the dashed line stands for the average channel gain curve of the system.

Comparing (a) and (b) reveals when there is the LoS in the channel, since the LoS will reduce the fluctuation of channel coefficiency, the possible average channel gain of the system will be reduced. (b) and (c) show (intervals in the brackets) when the system fading is comparatively slow, the transmission delay will be comparatively larger.

To solve this problem, P. Viswanath, D. N. C. Tse and R. Laroia, etc. "Opportunistic beamforming using dumb Antennas", IEEE Trans. Infor. Theory, Vol. 48, No. 6, pp. 1277-1294. June. 2002, proposed a solution.

In the method, suppose there are $n_T$ antennas at the base station and every user has one receiving antenna, then the channel of the user is a vector $h_k \in C^{n_T \times 1}$. Before transmitted, the data signal will be multiplied with a $n_T$-dimension random complex vector $w \in C^{n_T \times 1}$, and the data signal will be transmitted from all the $n_T$ antennas. The channel gain detected by each user is the equivalent channel gain $GN_k = |h^*_k w|$ with reference to the actual channel and the transmit vector. Each user feeds back the detected equivalent channel gain to the base station, which allocates the channel to the user with the maximum equivalent channel gain.

For example, in FIGS. 1$a$ and 1$b$, the user with the maximum equivalent channel gain is right inside the transmit beam generated by the transmit vector $h_k$. Changing the random complex vector W can change the statistics characteristics (such as correlation and time-varied characteristics) of the equivalent channel gain to meet the request of user scheduling. However, with this method, only one user can be scheduled at one time. For example, user 1 is scheduled at $t_1$ and user 2 is scheduled at $t_2$. In this way, a lot of space resource is wasted and the throughput of the system is reduced in high SNR region.

In order to overcome this shortcoming, R. Laroia, J. Li, S. Rangan and M. Srinivasan, etc., "Enhanced opportunistic beamforming," IEEE VTC2003-Fall, Vol. 3, PP. 1762-1766, October 2003, proposed multiple random beamforming.

Since $n_T$ transmitting antennas can support $n_T$ independent transmit beams theoretically, the method generates $n_T$ random transmit vectors $w_n$ (in which n=1, ... $n_T$) and every user will then feed back a best transmit beam and the corresponding equivalent channel gain. Maybe more than one user will select the same transmit beam but the base station will allocate the beam to the user with the maximum equivalent channel gain. The method has the following shortcomings:

1) The probable interference between random transmit beams is not taken into account. For example, in FIG. 3, since user 1 and user 2 correspond to the main lobes of beam 1 and beam 2 respectively, user 1 and user 2 are scheduled according to the method. However, when the side lobe of beam 1 interferes user 2 greatly, the actual performance of user 2 corresponding to beam 2 may be not as good as that of user 3. So interference should be taken into account in multiple user scheduling.

2) $n_T$ users have to be scheduled at one time. However, the channel condition is always in change in practice and for most of the time this amount of users cannot be supported simultaneously. Compulsive multi-user support will cause the decline of the system performance.

In addition, how to schedule the users with a plurality of antennas is not disclosed in the method.

J. Chung, C. S. Hwang, K. Kim, and Y. K. Kim, etc., "A random beamforming technique in MIMO systems exploiting multiuser diversity," IEEE JSAC, Vol. 21, No. 5, June 2003, proposed a method using random beamforming when the user has a plurality of antennas. However, all the beams are allocated to the same user according to this method, which is apparently not the optimal.

SUMMARY

A MIMO communication system based on random beamforming and its user scheduling method is described. In one embodiment, a MIMO communication system based on random beamforming, includes a transmitter to transmit the data frame including at least the channel estimation signal and the user data, and at least one receiver to receive the data frame from the transmitter and to produce the corresponding feedback information and recover the user data, where the transmitter produces the scheduling information according to the feedback information and utilizes the scheduling information to implement user scheduling, and the scheduling information includes the scheduled users, data streams that should be supported by each scheduled user and the transmit beam adopted by each data stream.

BRIEF DESCRIPTION OF THE DRAWINGS

Please refer to the following drawings for further understanding of the present invention.

DETAILED DESCRIPTION OF THE INVENTION

Figure 1A:
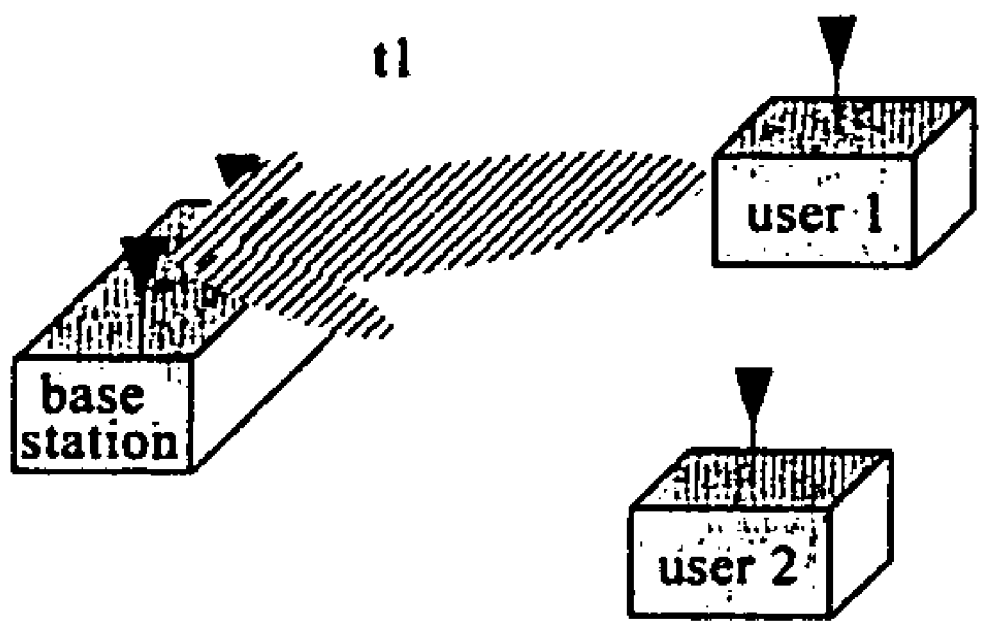
FIGS. 1(a) and 1(b) are the system architecture diagrams with one transmitting antenna at the base station and two users.
Figure 1B:
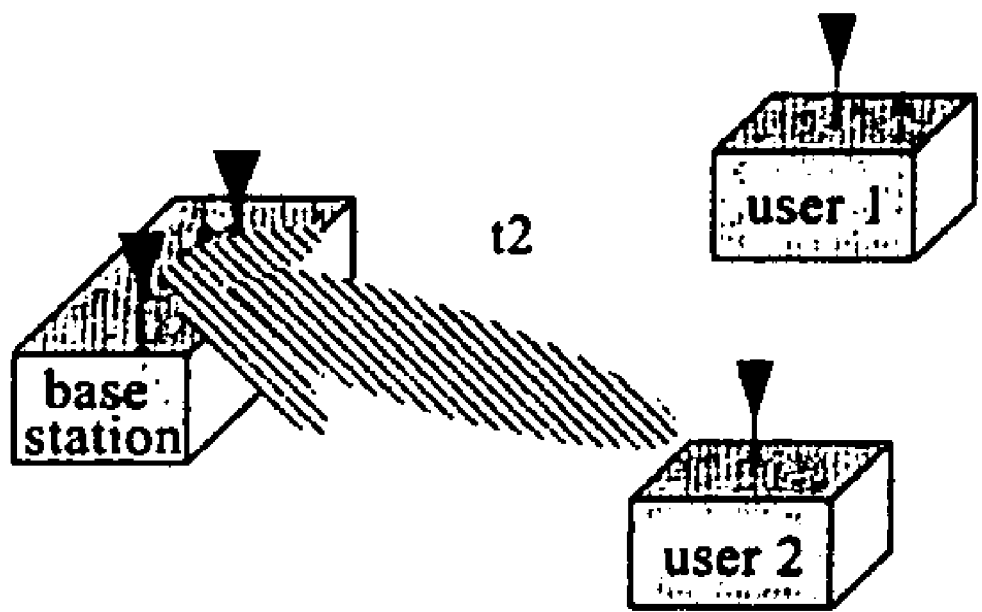
Figure 2:
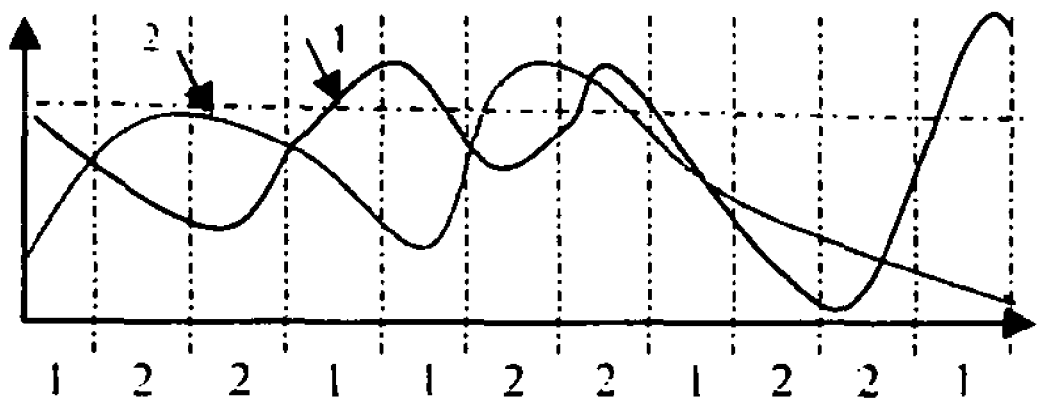
FIG. 2(a) shows the channel gain when the channel condition is good; (b) shows the channel gain when there is the LoS in the channel; (c) shows the channel gain when the system is in slow fading.
Figure 2:
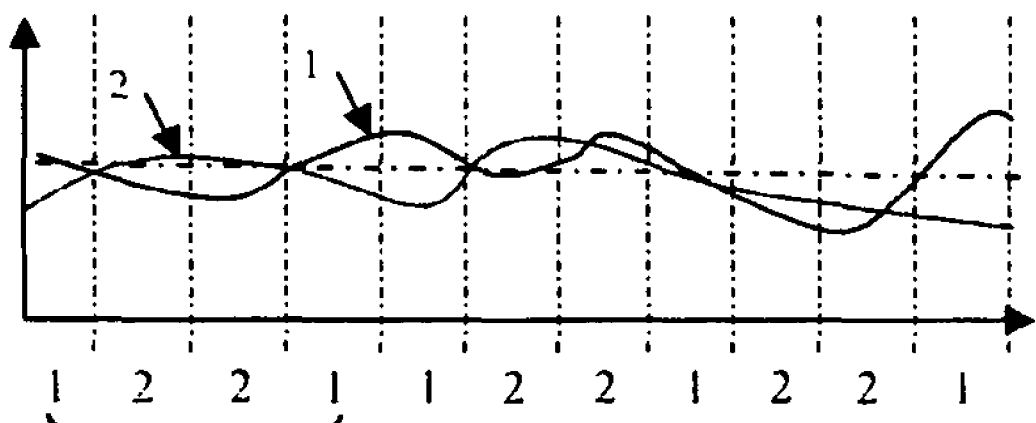
Figure 2:
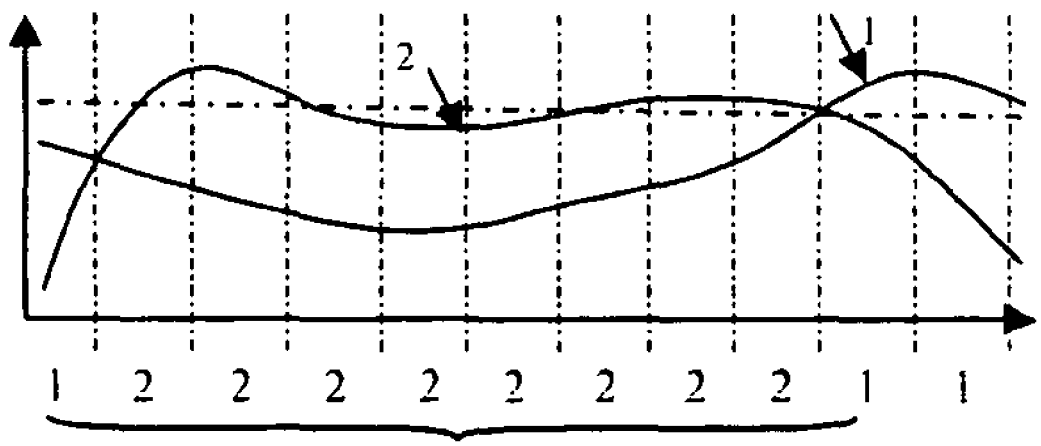
Figure 3:
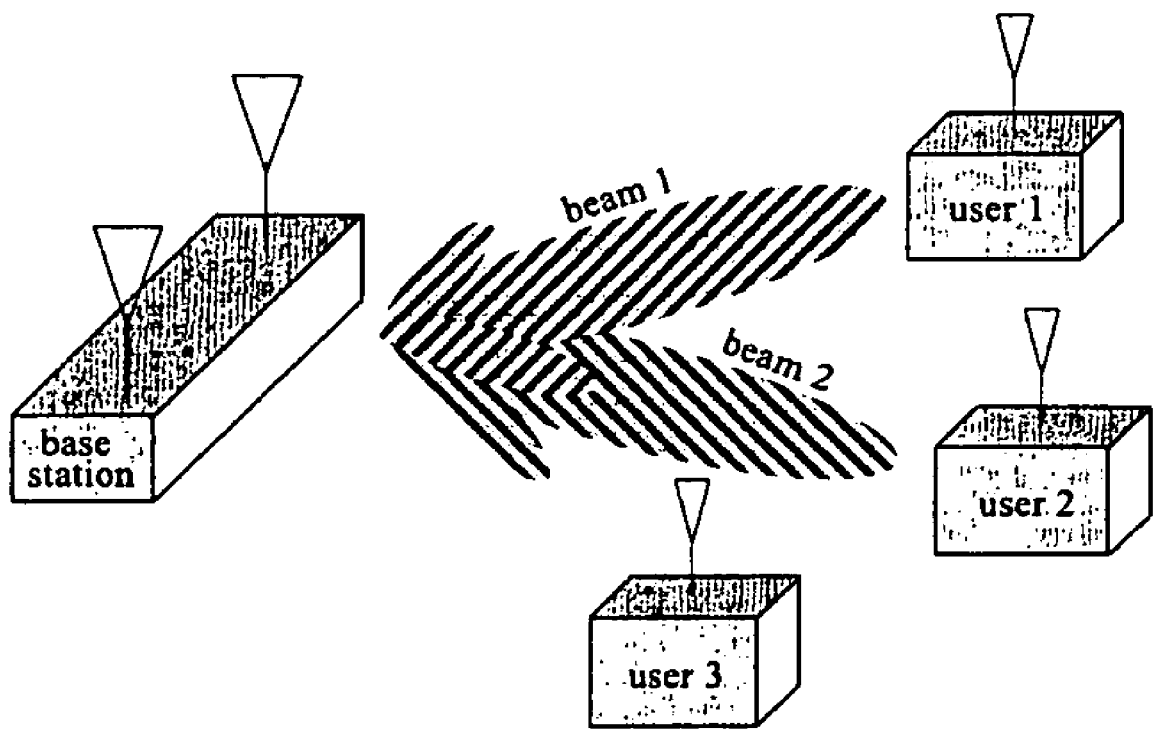
FIG. 3 is a diagram showing the probable interference between random transmit beams in MIMO system.

A MIMO communication system based on random beamforming is disclosed. In one embodiment, the system includes a user scheduling method.

According to the first embodiment of the present invention, the MIMO communication system based on random beamforming includes: a transmitter to transmit the data frame including at least the channel estimation signal and the user data, and at least one receiver to receive the data frame from the transmitter and to produce the corresponding feedback information and recover the user data, wherein the transmitter produces the scheduling information according to the feedback information and utilizes the scheduling information to implement adaptive user scheduling, and the scheduling information includes the scheduled users, data streams that should be supported by each scheduled user and the transmit beam adopted by each data stream.

According to a second embodiment of the present invention, the feedback information includes a group of the best transmit beams for each receiver and the signal-to-interference ratio corresponding to each transmit beam in the group of the best transmit beams.

According to a third embodiment of the present invention, the feedback information further includes a group of transmit beams that are with lowest interference to each receiver.

According to a fourth embodiment of the present invention, the feedback information includes a group of the best transmit beams for each receiver, the equivalent channel gain of each transmit beam in this group, a group of transmit beams that are with lowest interference to each receiver and the degradation factors caused by each of them to the group of best transmit beams.

According to the fifth embodiment of the present invention, a user scheduling method of the MIMO communication system based on random beamforming includes: (a) the receiver producing the feedback information according to the channel fading condition between the transmitting antenna and the receiving antenna and feeding back the feedback information to the transmitter; (b) the transmitter receiving the feedback information, producing the scheduling information according to the feedback information and scheduling the user according to the scheduling information, wherein the scheduling information includes the scheduled user, data streams that should be supported by each scheduled user and the transmit beam adopted by each data stream.

In one embodiment, operation (b) can include: 1) setting the scheduled user set and the allocated transmit beam set to null; 2) comparing all the fed back SIRs and selecting the user with the maximum SIR to be added to the scheduled user set and adding the corresponding transmit beam to the allocated transmit beam set; 3) comparing all the fed back SIRs and selecting the user with the maximum SIR among the unscheduled users, if the selected user and the corresponding transmit beam not in the allocated transmit beam set, adding the user to the scheduled user set and the corresponding transmit beam to the allocated transmit beam set; 4) repeating 3) until finishing user scheduling; and 5) implementing user scheduling of the system according to the final scheduled user set and the allocated transmit beam set.

In one embodiment, (b) can also include: 1) setting the scheduled user set and the allocated transmit beam set to null; 2) comparing all the fed back SIRs and selecting the user with the maximum SIR to be added to the scheduled user set and adding the corresponding transmit beam to the allocated transmit beam set; 3) finding the transmit beam with the minimum interference in the corresponding groups in response to the user in the scheduled user set and selecting the user with the maximum SIR according to the transmit beam to be added to the scheduled user set and at the same time, adding the corresponding transmit beam to the allocated transmit beam set; 4) repeating 3) until finishing user scheduling; and 5) implementing user scheduling of the system according to the final scheduled user set and the allocated transmit beam set.

In another embodiment, (b) can include: 1) setting the scheduled user set and the allocated transmit beam set to null; 2) comparing all the fed back equivalent channel gains and selecting the user with the maximum equivalent channel gain to be added to the scheduled user set and adding the corresponding transmit beam to the allocated transmit beam set; 3) finding the transmit beam with the minimum interference in the corresponding groups in response to the user in the scheduled user set and finding the user with the maximum equivalent channel gain corresponding to the transmit beam with the minimum interference; 4) determining whether the addition the user has increased the system capacity according to the fed back degradation factors, if the adding of the user has increased the system capacity, adding the user to the scheduled user set and at the same time, adding the corresponding transmit beam to the allocated transmit beam set; if the adding of the user has reduced the system capacity, not adding the user to the scheduled user set and ending scheduling; 5) after the adding of the user, repeating 3) and 4) successively until the end of scheduling; and 6) implementing user scheduling of the system according to the final scheduled user set and the allocated transmit beam set.

Compared with the current technologies, the present MIMO communication system based on random beamforming and its user scheduling method can schedule the users with fixed number or adaptively according to the instant channel condition as well as different feedback information so that the intelligence of the system control and communication stability can be improved to approach the maximum system capacity. Embodiments further include one or more of the following advantages especially for adaptive scheduling:
1) each transmitter can require for transmit beams at most as many as its receiving antennas;
2) each transmitter feeds back the group of the best transmit beams, the equivalent channel gain provided by the selected transmit beam, the group of transmit beams that are with lowest interference to each receiver, the degradation factors caused by each of them to the group of best transmit beams, which can reduce the algorithm complexity when selecting antennas and the number of the users to be scheduled need not be known priorly; and
3) for each transmitter, the number of the users can be scheduled depends on the instant channel condition and need not be pre-specified.

Figure 4:
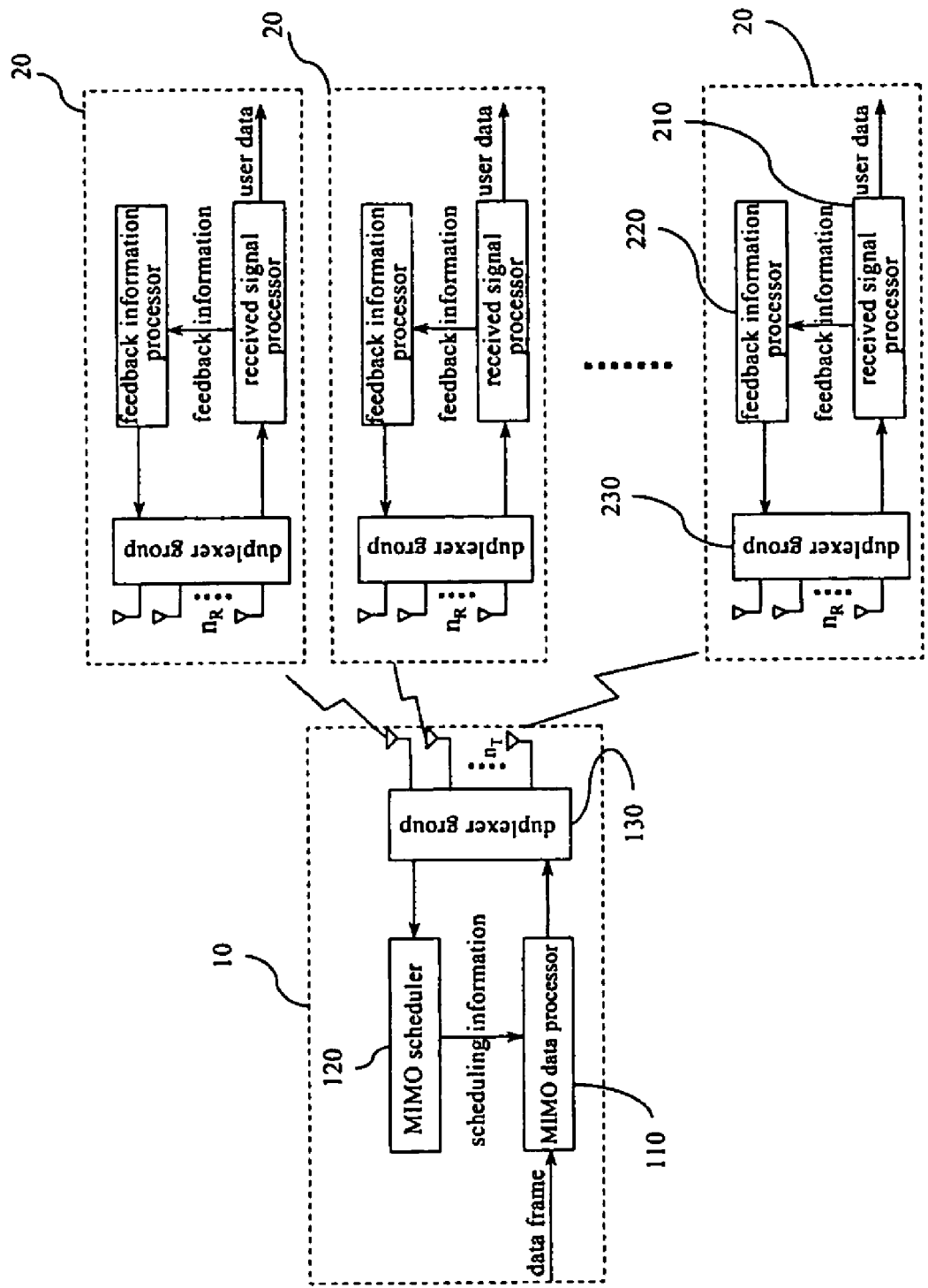
FIG. 4 is a block diagram showing a MIMO communication system based on random beamforming of the present invention.
Figure 5:
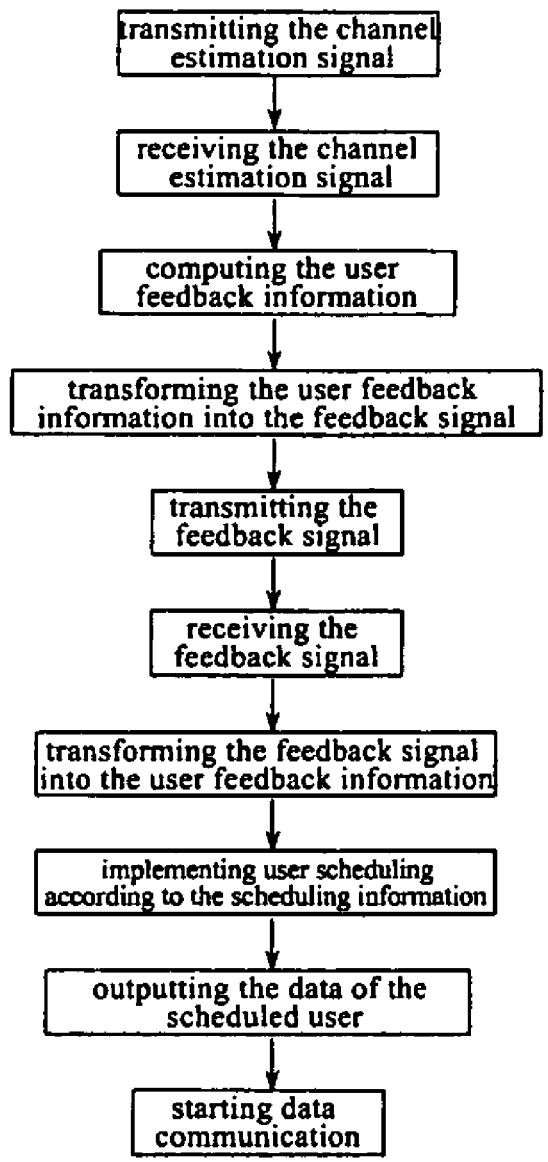
FIG. 5 is a flow diagram of user scheduling of the MIMO communication system of FIG. 4.
Figure 6:
FIG. 6 is a diagram showing the frame architecture adopted in the MIMO communication system based on random beamforming.

FIG. 4 is a block diagram showing a MIMO communication system based on random beamforming of one embodiment of the present invention, wherein the MIMO communication system further includes a transmitter 10 (base station) and a plurality of receivers 20 (user). FIG. 5 is a flow diagram illustrating user scheduling of the MIMO communication system of FIG. 4. FIG. 6 is a diagram showing the frame architecture adopted in the MIMO communication system based on random beamforming.

As shown in FIG. 4-6, the transmitter 10 has a MIMO data processor 110, a MIMO scheduler 120, a duplexer group 130 and $n_T$ transmitting antennas. Every receiver 20 has a received signal processor 210, a feedback information processor 220, a duplexer group 230 and $n_R$ receiving antennas, wherein every receiver 20 can have different number of receiving antennas. The frame architecture includes: a channel estimation slot, a channel feedback slot and a data transmission slot. Other slots can be set according to the system requirement. It is simplified here for the purpose of illustration.

Scheduling Information Obtaining Process

FIG. 6 shows before the transmitter 10 transmits the user data signal, it will transmit the channel estimation signal to the receiver 20 in the form of transmit beams from $n_T$ transmitting antennas by the duplexer 130.

Suppose the transmission signal of the transmitter 10 is a $n_T$ dimension complex vector $x \in C^{n_T}$, the signal received by each receiver is a $n_R$ dimension complex vector $y_k \in C^{n_R}$ and there is a $n_R \times n_T$ dimension channel fading matrix between the transmitter 10 and the receiver 20:

$$H_k = [h_1^k, \ldots, h_{n_T}^k] = \begin{bmatrix} h_{1,1}^k & h_{1,2}^k & \cdots & h_{1,n_T}^k \\ h_{2,1}^k & h_{2,2}^k & & \\ \vdots & & \ddots & \vdots \\ h_{n_R,1}^k & & \cdots & h_{n_R,n_T}^k \end{bmatrix} \quad (1)$$

wherein $h_{i,j}^k$ represents the channel transmission characteristic between the $i^{th}$ transmitting antenna of the transmitter 10 and the $j^{th}$ receiving antenna of the receiver 20 (k represents the $k^{th}$ user).

And the transfer function of the system can be represented as:

$$y_k = H_k x_k + \mu_k$$

$$k = 1, \ldots, K \quad (2)$$

wherein $\mu_k \in C^{n_T}$ is a $n_R$ dimension complex vector standing for the white noise of the receiver 20.

Thus, every receiver 20 knows the exact channel fading condition, which takes into account the actual channel fading condition and the random complex vector of the transmitter. Each receiver 20 can process the channel fading condition through the received signal processor 210 to obtain the user feedback information, which is transferred to the information processor 220.

The feedback information processor 220 processes the received user information and transforms it into the feedback signal (RF signal) for MIMO communication system. The feedback signal is fed back to the transmitter 10 through the feedback channel and the antenna of the receiver 20.

After receiving the feedback signal, the antenna of transmitter 10 transmits it to the MIMO scheduler 120. The MIMO scheduler 120 produces scheduling information according to the signal and controls the operation of the MIMO data processor 110 according to the scheduling information. In this way, the MIMO communication system gets to the scheduling condition of the maximum capacity, i.e. the optimal user scheduling is achieved according to the scheduling information.

The above method to obtain the channel fading condition uses the channel estimation signal (i.e. the pilot signal), which inserts the channel estimation signal in the data frame. The receiver 20 obtains the channel fading condition between the transmitter 10 and the receiver 20 according to the channel estimation signal and the received signal processor 210 further processes the channel fading condition to obtain the user feedback information.

However, channel blind estimation method can be used in the present invention to obtain the channel fading condition, i.e. the channel estimation slot need not be set in the data frame, and when the receiver 20 receives the data from the transmitter 10, the channel blind estimation will be used to obtain the channel fading condition and the channel fading condition will be processed by the received signal processor 210 to obtain the user feedback information. Then the insertion of the channel estimation signal is avoided in order to prevent the waste of the frequency resource.

Figure 7:
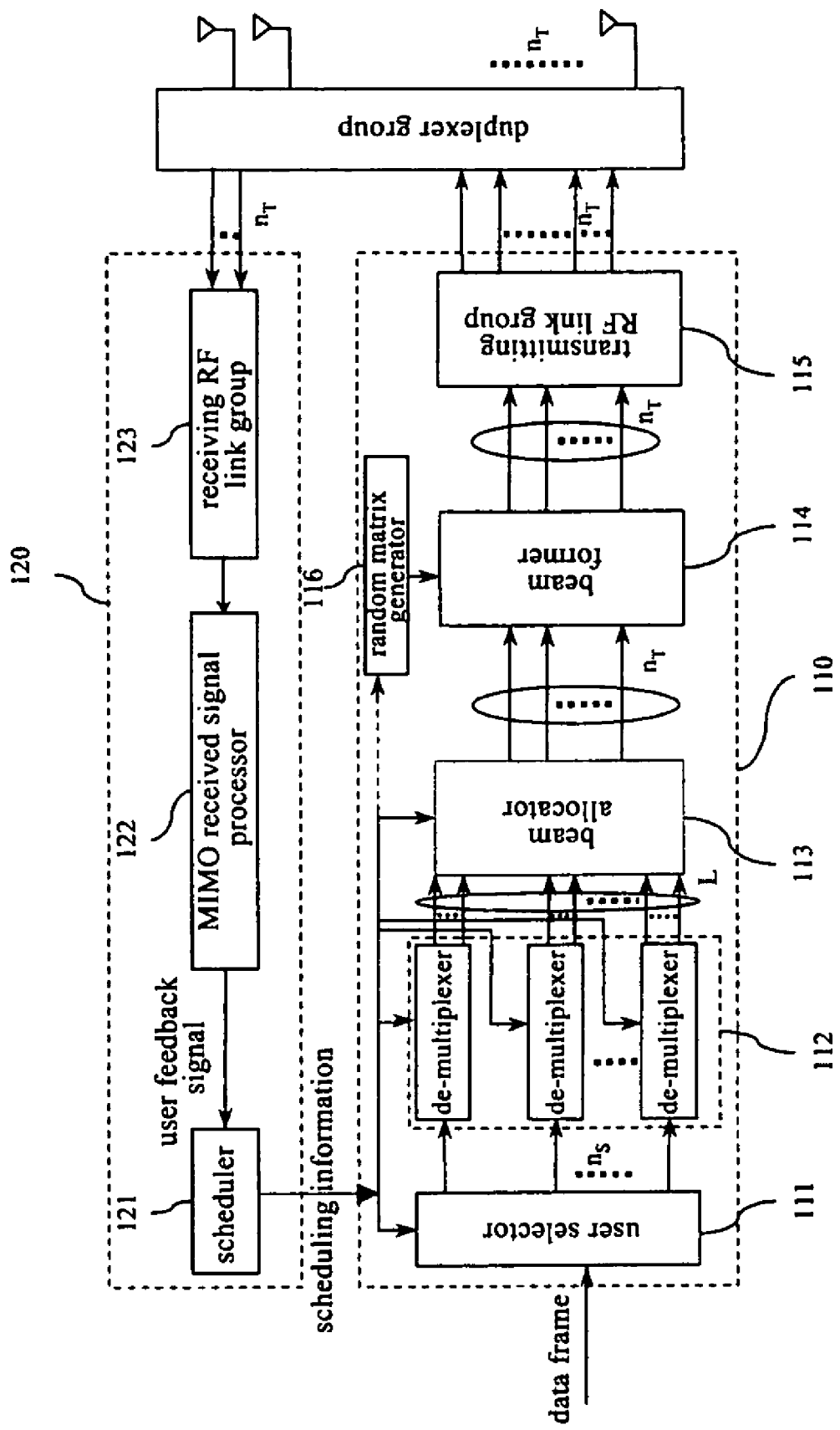
FIG. 7 is a diagram further showing the architecture of the transmitter 10 of the MIMO communication system of the present invention.
Figure 8:
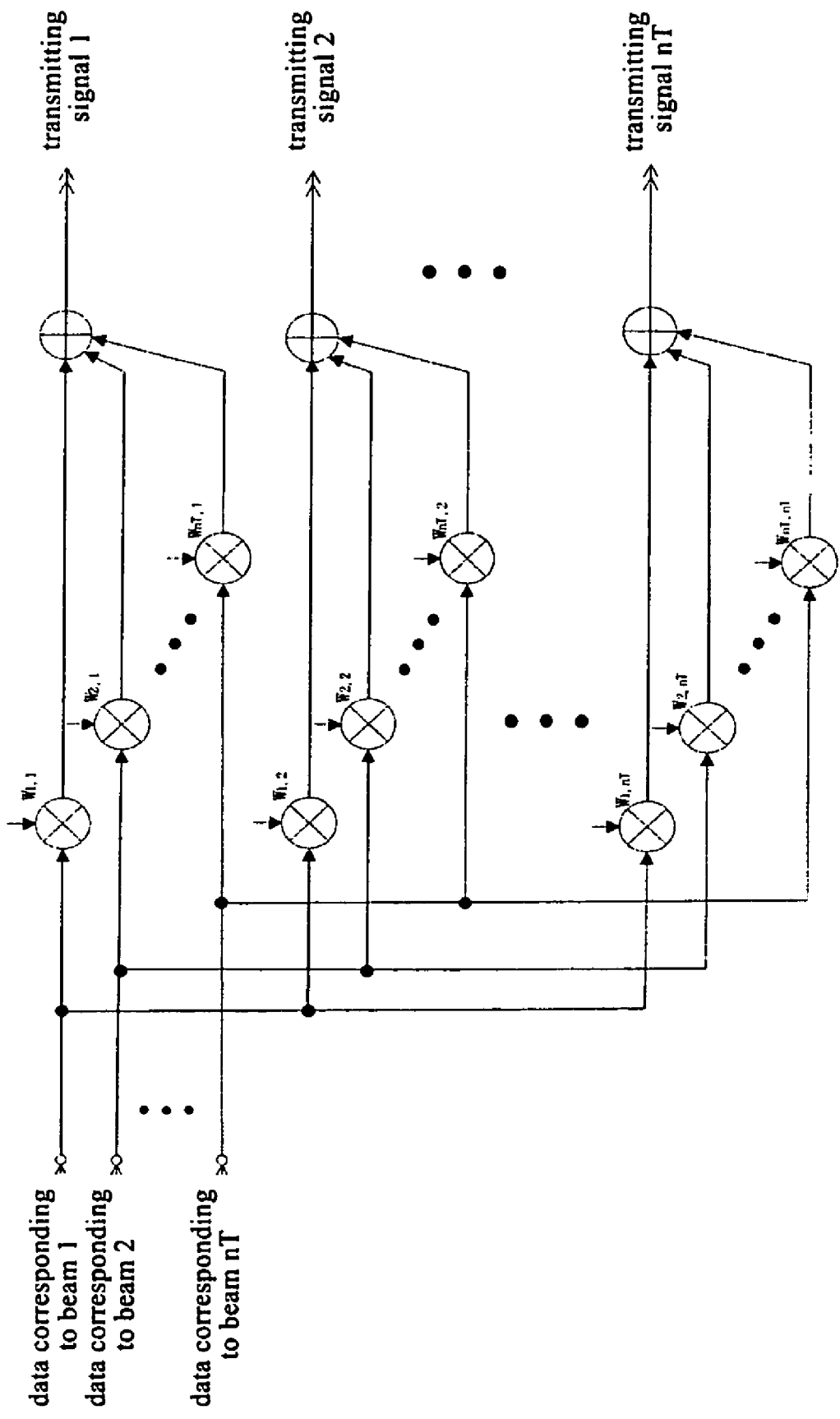
FIG. 8 is an architecture diagram of the beamformer 114 of FIG. 7.
Figure 9:
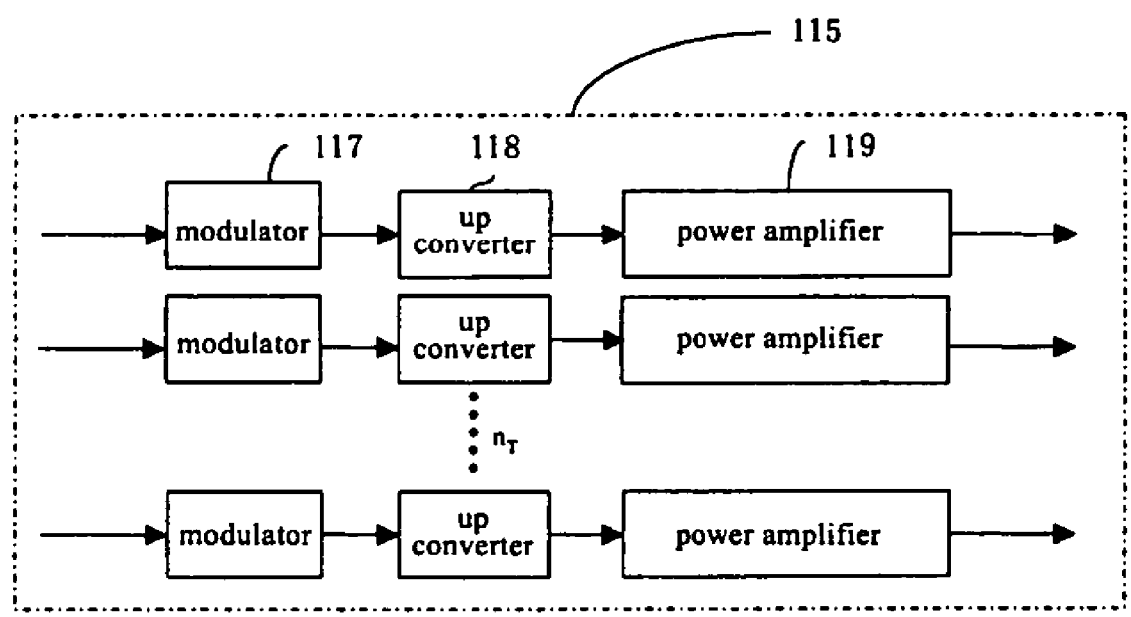
FIG. 9 is an architecture diagram of the transmitting RF link group of the transmitter 10.
Figure 10:
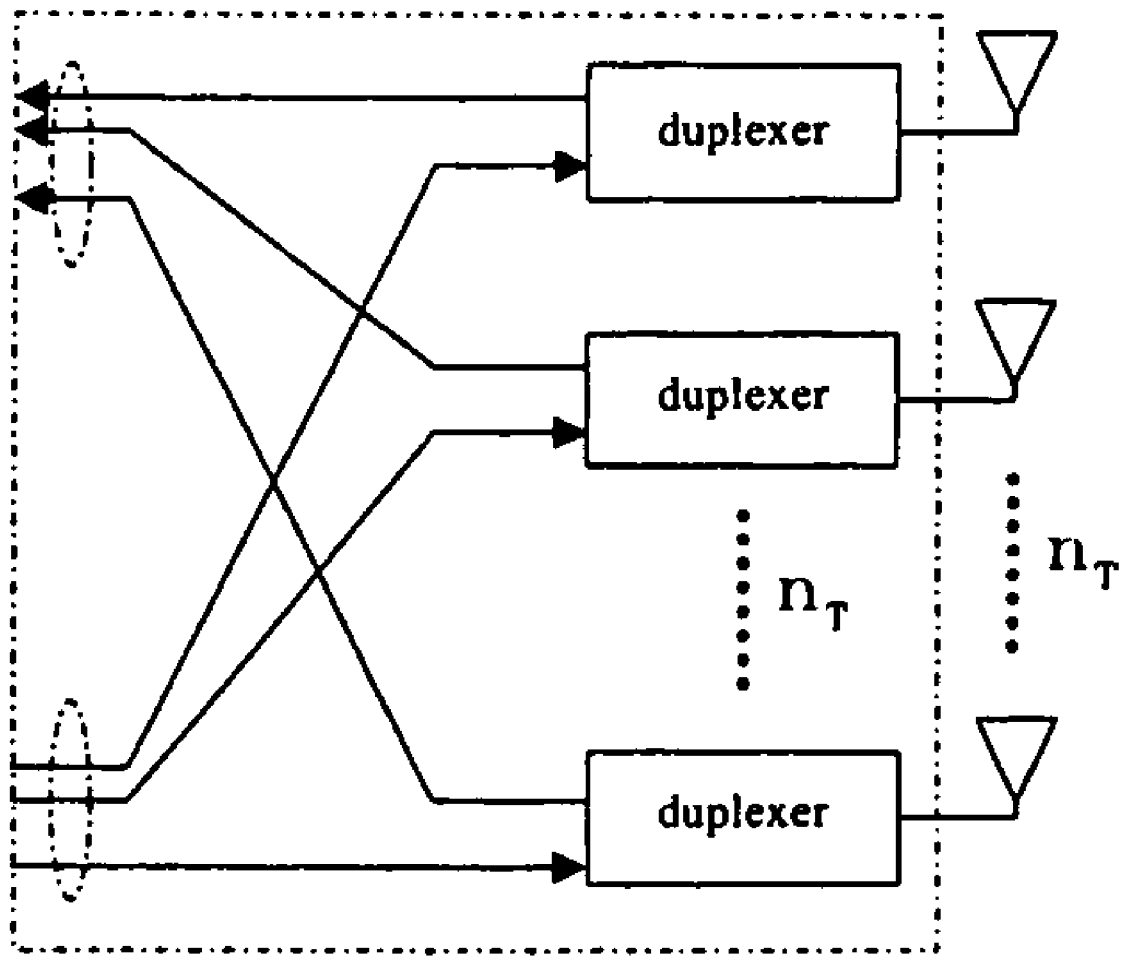
FIG. 10 is a diagram showing the duplexer group 130 of the transmitter 10 of the present invention.
Figure 11:
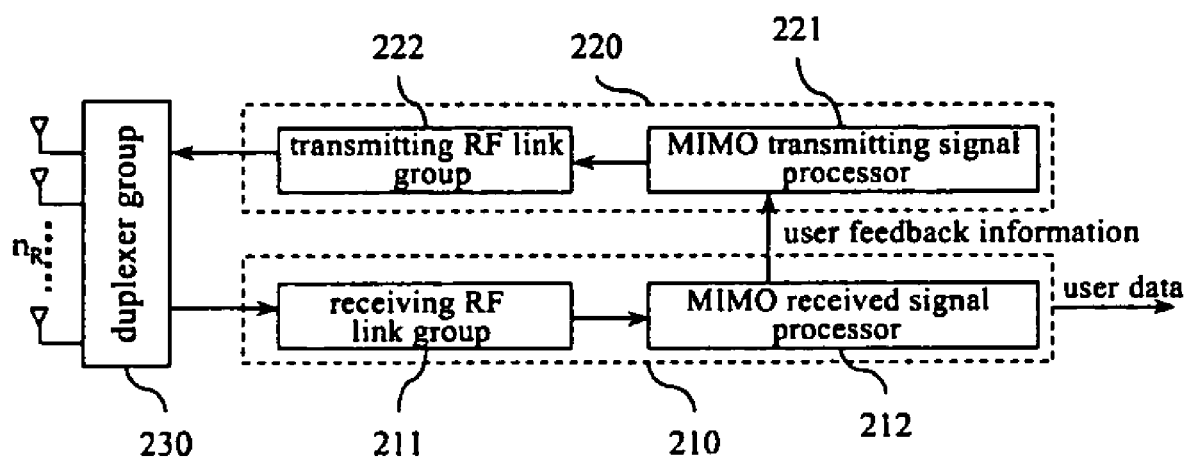
FIG. 11 is a diagram further showing the architecture of the receiver 20 of the MIMO communication system of the present invention.

FIG. 7 is a diagram further showing the architecture of the transmitter 10 of the MIMO communication system of the present invention. FIG. 8 is an architecture diagram of the beamformer 114 of FIG. 7. FIG. 9 is an architecture diagram of the transmitting RF link group of the transmitter 10. FIG. 10 is a diagram showing the duplexer group 130 of the transmitter 10 of the present invention. FIG. 11 is a diagram further showing the architecture of the receiver 20 of the MIMO communication system of the present invention. Layered time-space signal processing method is used in FIG. 7 and FIG. 11 to describe MIMO communication. Signal processing methods and apparatus disclosed by other prior art references can also be adopted to process the signals, such as the space-time coding.

User Data Transmitting/Receiving and Scheduling Process

Transmitter 10

FIG. 7 shows the transmitter 10 has a MIMO data processor 110, a MIMO scheduler 120, a duplexer group 130 and $n_T$ transmitting antennas.

The MIMO scheduler 120 includes a receiving RF link group 123, a MIMO received signal processor 122 and a scheduler 121, wherein receiving RF link group 123 has the same amount of receiving RF links as that of the transmitting antennas, which are used to transform the received feedback signal into the corresponding symbol stream. The MIMO received signal processor 122 produces the corresponding feedback information of the user by space-time processing the symbol stream. The scheduling information includes the scheduled user, data streams that should be supported by each scheduled user and the transmit beam adopted by each data stream. The scheduler 121 utilizes the scheduling information to control the signal processing of the MIMO data processor 110.

The MIMO data processor 110 includes a user selector 111, a plurality of parallel de-multiplexers 112, a beam allocator 113, a beamformer 114, a transmitting RF link group 115 and a random matrix generator 116.

Under the control of the scheduling information (according to "users to be scheduled" in the scheduling information), the user selector 111 is used to select the users to be scheduled and to output the corresponding user data. The number here is represented as nS and nS is less than or equal to the number of the antennas $n_T$ of the transmitter 10.

Under the control of the scheduling information, nS de-multiplexers 112 are chosen to de-multiplex the user data of the scheduled nS users, i.e. to divide the user data of the scheduled nS users into L ($nS \leq L \leq n_T$) symbol streams, according to the "symbol streams to transmit data for each scheduled user" in the scheduling information. L is the sum of the symbol streams allocated to all the scheduled users. Actually, each symbol stream of every user data corresponds to one antenna at the receiver.

Then the beam allocator 113 is used to process the L symbol streams from the de-multiplexer 112 as L layers. The association between the L symbol streams and the transmit beams is established according to the "the transmit beam corresponding to each symbol stream" and then the symbol streams are outputted. FIG. 7 shows there are $n_T$ outputs but actually only L symbol streams are the user data while other ($n_T$–L) symbol streams don't occupy any user data.

The random matrix generator 116 is used to generate the random $n_T \times n_T$ dimension matrix (represented as $W_{ij}$, wherein i and j are positive integers of $1-n_T$) and to input the $n_T \times n_T$ dimension matrix to the beamformer 114. The random $n_T \times n_T$ dimension matrix can be the experience matrix or the channel matrix according to the channel information. The random matrix generator 116 can receive the scheduling information from the scheduler 121 and generate the corresponding random matrix according to the channel information in the scheduling information, or, can generate the experience matrix independent of the scheduler.

The beamformer 114 is used to implement weighted operation on the $n_T$ symbol streams (including the L symbol streams with the user data and the ($n_T$–L) symbol streams without any user data) from the beam allocator 113 according to the random $n_T \times n_T$ dimension matrix generated by the random matrix generator 116 and to generate $n_T$ transmission signals.

The transmitting RF link group 115 is used to receive the $n_T$ transmission signals from the beamformer 114 and to transform the $n_T$ signals into the corresponding RF signals to be transmitted by the $n_T$ transmitting antennas at the duplexer group 130.

FIG. 8 is an architecture diagram of the beamformer 114. Wherein the beamformer 114 is composed by $n_T \times n_T$ multiplier and $n_T$ adders. The beamformer 114 can generate $n_T$ transmission signals corresponding to the $n_T$ symbol streams and each transmission signal is generated in approximately the same way. For simplification, the $i^{th}$ transmission signal will be chosen as an example to illustrate.

Firstly, for the $i^{th}$ transmission signal, every element (coefficient) in the $i^{th}$ line ($W_{1,i}$ to $W_{n_T,i}$) of the $n_T \times n_T$ dimension matrix from the random matrix generator 116 is multiplied with each symbol stream. Then the results of the multiply operation are added and the $i^{th}$ transmission signal is formed.

FIG. 9 further describes the detailed architecture of the transmitting RF link group 115, which includes $n_T$ parallel transmitting RF link groups. Each transmitting RF link group includes a modulator 117, an up converter 118 and a power amplifier 119, which are connected in serial, and the power amplifier 119 can be a large power linear amplifier. The $n_T$ transmitting RF link groups are used to transform the $n_T$ signals from the beamformer 114 respectively into the corresponding RF signals.

FIG. 10 is a diagram showing the duplexer group 130 of the transmitter 10 of the present invention. The duplexer group 130 includes $n_T$ parallel duplexers. Every duplexer is connected with a corresponding transmitting antenna, the transmitting RF link group 115 and the receiving RF link group 123.

Receiver 20

Only one receiver 20 is cited here for simplification.

In FIG. 11, the receiver 20 has a received signal processor 210, a feedback information processor 220, a duplexer group 230 and $n_R$ receiving antennas.

Wherein the received signal processor 210 includes a receiving RF link group 211 and a MIMO received signal processor 212. The feedback information processor 220 includes a MIMO transmitting signal processor 221 and a transmitting RF link group 222.

The receiving RF link group 211 has $n_R$ (the same amount as the receiving antennas) parallel receiving RF links (not shown in the figure) to recover the received RF signals into the corresponding symbol streams, which are to be transmitted to the MIMO received signal processor 212.

The MIMO received signal processor 212 recovers the symbol streams into the original user data and outputs the data.

The transmitting of the data frame shows the channel estimation signal in the channel estimation slot of the data frame is transmitted in the same way. However, there are no selecting processes such as the user selecting under the scheduling information. At the same time, the channel estimation signal is divided into $n_T$ symbol streams, which are corresponding to the $n_T$ beams and then the $n_T$ transmit beams are formed through the beamformer and transmitted by the antennas.

Generally, the time to generate a data frame is at the microsecond level and to generate a random matrix is at the millisecond level. Since the change of the elements in the random matrix are comparatively much slower than the change of the data frame, the information fed back from the channel estimation slot can be used to reflect the instant channel condition.

Next the scheduling process of the present invention will be illustrated with reference to different user conditions. In the scheduling process of one embodiment of the present invention, every receiver 20 with a plurality of antennas may be considered as the same amount of receivers 20 with only one antenna. Here the example is that every receiver 20 is with one antenna, but can be extended to the condition when each receiver 20 has a plurality of antennas.

A First Scheduling Method

Every receiver 20 can process the received signal by the received signal processor 210 according to the channel fading condition, obtain the user feedback information and transmit the information to the feedback information processor 220. The user feedback information includes: the group of the best transmit beams $n_k$ of each receiver 20 and the signal-to-interference ratio $GNI_k$ corresponding to each transmit beam in the group of the best transmit beams. The number of the best transmit beams in the group depends on the condition of the actual channel.

$$n_k = \arg \max_{n=1 \ldots n_T} |H_k^* w_n| \qquad (3)$$

$$GNI_k = \frac{|H_k^* w_{n_k}|^2}{1 + |H_k^* \sum w_n|^2} \qquad (4)$$

wherein $w_n$ represents the random complex vector at the transmitter and $H_k$ represents the channel fading matrix between the transmitter 10 and the receiver 20.

The feedback information processor 220 processes the received user feedback information and transforms it into the feedback signal for MIMO communication system. The feedback information is fed back to the transmitter 10 by the antenna of the receiver 20.

When the scheduler 121 of the transmitter 10 receives the feedback signal, the system scheduling starts. Since every receiver 20 feeds back its group of the best transmit beams and the signal-to-interference ratio (SIR) $GNI_k$ corresponding to each transmit beam in the group of the best transmit beams, the scheduling process mainly includes:

1) setting the scheduled user set SU and the allocated transmit beam set SB to null;
2) comparing all the fed back SIRs $GNI_k$ and selecting the user with the maximum SIR $GNI_k$ to be added to the scheduled user set SU and adding the corresponding transmit beam to the allocated transmit beam set SB;
3) comparing all the fed back SIRs $GNI_k$ and selecting the user with the maximum SIR $GNI_k$ among the unscheduled users, adding the user to the scheduled user set SU and the corresponding transmit beam to the allocated transmit beam set SB;
4) repeating 3) until finishing user scheduling;
5) finally, controlling the MIMO data processor 110 to divide the data streams of the scheduled user to independent symbol streams according to the final scheduled user set SU and the allocated transmit beam set SB, to allocate the symbol streams to the corresponding transmit beams and to transmit them by the transmitting antenna.

In the above scheduling 3) or 4), if some receiver 20 (user) has already been added in the scheduled user set SU and another transmit beam in the group of the best transmit beams is chosen, since the receiver 20 only has one antenna, it can not be scheduled. And the scheduling process ends.

At the same time, in the above scheduling process 3) or 4), if the transmit beam corresponding to the user has already been added in the allocated transmit beam set, the user cannot be scheduled. And the scheduling process ends.

If every receiver 20 has a plurality of antennas and every antenna is supposed to be a receiver (user), the scheduling of one receiver with a plurality of antennas is the same as that of one receiver with one antenna.

A Second Scheduling Method

When the MIMO communication system based on random beamforming of the present invention takes into account the interference between transmit beams and the number of the users to be scheduled is fixed to M ($1<M<n_T$), each receiver 20 can process the received signal through the received signal processor 210 according to the channel fading condition, to obtain the user feedback information, which is transferred to the information processor 220. The user feedback information includes: the group of the best transmission beams $n_k$ of each receiver 20, the signal-to-interference ratio $GNI_k$ corresponding to each transmit beam in the group and the group $Q_k$ of the transmit beams which interfere the receiver minimally.

The number of the best transmit beams in the best group and in the (M−1) group $Q_k$ which interfere the receiver minimally depends on the condition of the actual channel, with the principle that the same transmit beam, cannot be included in both the groups.

$$Q_k = \underset{S=\{s_1,\ldots\,s_{M-1}|s_i=1,\ldots,n_T\}}{\arg\min} \left| h_k^* \sum_{n\in S} w_n \right| \quad (5)$$

wherein S represents all the probable sets of the (M−1) beams that interfere the receiver minimally from the $n_T$ beams.

The feedback information processor 220 processes the received user information and transforms it into the feedback signal (RF signal) for MIMO communication system. The feedback signal is fed back to the transmitter 10 through the feedback channel of the receiver 20.

When the scheduler 121 of the transmitter 10 receives the feedback signal, the system scheduling starts. Since every receiver 20 feeds back its group of the best transmit beams $n_k$, the signal-to-interference ratio $GNI_k$ corresponding to each transmit beam in the group of the best transmit beams and the (M−1) group $Q_k$ of the transmit beams which interfere the receiver minimally. The scheduling process mainly includes:

1) setting the scheduled user set SU and the allocated transmit beam set SB to null;
2) comparing all the fed back SIRs $GNI_k$ and selecting the user with the maximum SIR $GNI_k$ to be added to the scheduled user set SU and adding the corresponding transmit beam to the allocated transmit beam set SB;
3) finding the transmit beam with the minimum interference in the corresponding groups $Q_k$ in response to the user in the scheduled user set and selecting the user with the maximum SIR according to the transmit beam to be added to the scheduled user set and at the same time, adding the corresponding transmit beam to the allocated transmit beam set;
4) repeating 3) until finishing user scheduling;
5) finally, controlling the MIMO data processor 110 to divide the data streams of the scheduled user to independent symbol streams according to the final scheduled user set SU and the allocated transmit beam set SB, to allocate the symbol streams to the corresponding transmit beams and to transmit them by the transmitting antenna.

A Third Scheduling Method

When the MIMO communication system based on random beamforming of one embodiment of the present invention takes into account the interference between transmit beams and the influence on the system capacity by the interference, each receiver 20 can process the received signal through the received signal processor 210 to obtain the user feedback information, which is transferred to the information processor 220. The user feedback information includes: the group of the best transmit beams $n_k$ of each receiver 20, the equivalent channel gain $GN_k$ of each beam in the group, the $Q_k$ group of transmit beams that are with lowest interference to each receiver and the degradation factors $D_{k,i}$ caused by each transmit beam of the group $Q_k$ to the best transmit beam of the user.

$$\{D_{k,i}\} = \left\{ \frac{GN_k}{|h_k^* w_i|^2}, i \in Q_k \right\} \quad (6)$$

The feedback information processor 220 processes the received user information and transforms it into the feedback signal (RF signal) for MIMO communication system. The feedback signal is fed back to the transmitter 10 through the feedback channel of the receiver 20.

When the scheduler 121 of the transmitter 10 receives the feedback signal, the system scheduling starts. Since every receiver 20 feeds back the group of the best transmit beams $n_k$ of each receiver 20, the equivalent channel gain $GN_k$ of each beam in the group, the $Q_k$ group of transmit beams that are with lowest interference to each receiver and the degradation factors $D_{k,i}$ caused by each transmit beam of the group $Q_k$ to the best transmit beam of the user. The scheduling process mainly includes:

1) setting the scheduled user set SU and the allocated transmit beam set SB to null;
2) comparing all the fed back equivalent channel gains $GN_k$ and selecting the user with the maximum equivalent channel gain $GN_k$ to be added to the scheduled user set SU and adding the corresponding transmit beam to the allocated transmit beam set SB;
3) finding the transmit beam with the minimum interference in the corresponding groups $Q_k$ in response to the user in the scheduled user set and finding the user with the maximum equivalent channel gain corresponding to the transmit beam with the minimum interference;
4) judging whether the adding of the user has increased the system capacity according to the fed back degradation factor $D_{k,i}$, if the adding of the user has increased the system capacity, adding the user to the scheduled user set and at the same time, adding the corresponding transmit beam to the allocated transmit beam set; if the adding of the user has reduced the system capacity, not adding the user to the scheduled user set and ending scheduling;
5) after the adding of the user, repeating 3) and 4) successively until the end of scheduling;
6) finally, controlling the MIMO data processor 110 to divide the data streams of the scheduled user to independent symbol streams according to the final scheduled user set SU and the allocated transmit beam set SB and to transmit them by the transmitting antennas.

The third scheduling method can schedule the user adaptively and make full use of the channel to provide the maximum channel capacity.

Figure 12:
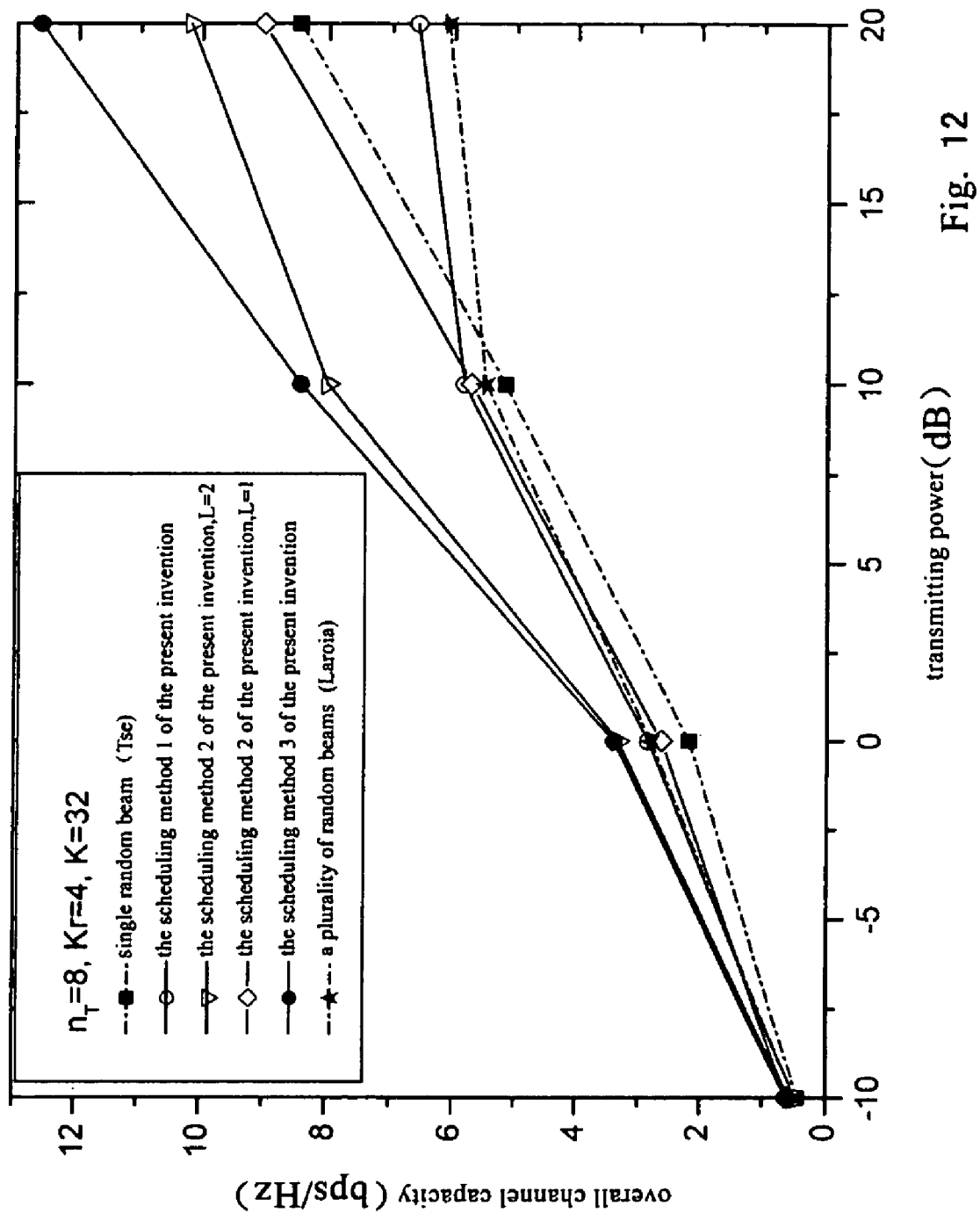
FIG. 12 is a diagram showing the performance compare of different scheduling methods under actual channel condition.

For better understanding of the advantages of the scheduling system and the method of the present invention, please refer to FIG. 12, which shows the performance comparison of different scheduling methods under actual channel condition with LoS. The x-coordinate stands for transmitting power and the y-coordinate stands for the overall channel capacity. Wherein the number $n_T$ of the transmit beams at the transmitter 10 is 8, the number k of the users is 32, the number of the receiving antennas of each user is 1, the channel is at the Ricean distribution, Ricean factor $k_R$ is 4.

FIG. 12 shows the channel capacity of the system (statistic average value under the corresponding condition) increases with the increase of the transmitting power, since the multiuser gain of the system increases correspondingly.

The comparison between the three scheduling methods shows the third method (adaptive method) of the present invention can realize the maximum channel capacity of the system all the time.

The first and the second scheduling methods of the present invention are better than those in reference 1 and 2 in the overall channel capacity of the system.

The MIMO communication system has the following characteristics (especially for the third scheduling method):
1) each transmitter 20 can require for transmit beams at most as many as its receiving antennas;

2) each transmitter feeds back the group of the best transmit beams, the equivalent channel gain provided by the selected transmit beam, the group of transmit beams that are with lowest interference to each receiver, the degradation factors caused by each of them to the group of best transmit beams, which can reduce the algorithm complexity when selecting transmit beams and the number of the users to be scheduled need not be known priorly, at the same time, the absolute channel capacity is not influenced by the number of users scheduled later; and 3) for each transmitter 10, the number of the users can be scheduled depends on the instant channel condition and need not be pre-specified.

The MIMO communication system based on random beamforming can realize adaptive user scheduling so that the intelligence of the system control and communication stability can be improved to approach the maximum system capacity.

What is claimed is:

1. A MIMO communication system based on random beamforming, including:
   a transmitter to transmit a data frame including at least a channel estimation signal and user data; and
   at least one receiver to receive the data frame from the transmitter and to produce corresponding feedback information and recover the user data;
   wherein the transmitter produces scheduling information according to the feedback information and utilizes the scheduling information to implement user scheduling, and the scheduling information includes scheduled users, data streams that should be supported by each scheduled user and a transmit beam adopted by each data stream;
   wherein the transmitter includes:
   a duplexer group and corresponding mounted transmitting antennas to transmit the data frame and to receive the feedback information from the receiver;
   a MIMO scheduler to produce scheduling information according to the feedback information; and
   a MIMO data processor to select the user for scheduling according to the scheduling information and to transmit the data of the selected user by the selected transmit beam, and
   the receiver includes:
   a duplexer group and the corresponding mounted receiving antennas to receive the data frame from the transmitter and to transmit the feedback signal of the user;
   a received signal processor to produce the feedback data of the user and to recover the user data according to the data frame; and
   a feedback information processor to transform the feedback information of the user into the feedback signal;
   wherein the MIMO data processor includes:
   a user selector to select the user for scheduling according to the scheduling information;
   a plurality of parallel de-multiplexers to divide the user data of the scheduled user and to output a plurality of symbol streams;
   a beam allocator to process the symbol streams outputted from the de-multiplexer and to establish the association between each symbol stream and the corresponding transmit beam;
   a random matrix generator to generate and output the random matrix;
   a beamformer to generate a plurality of transmission signals according to the symbol streams that have already established the association with the corresponding transmit beams and according to the random matrix from the random matrix generator; and
   a transmitting RF link group to receive a plurality of transmission signals from the beamformer and to transform the plurality of signals into the corresponding RF signals.

2. The MIMO communication system based on random beamforming of claim 1, wherein the feedback information includes a group of the best transmit beams for each receiver and the signal-to-interference ratio corresponding to each transmit beam in the group of the best transmit beams.

3. The MIMO communication system based on random beamforming of claim 2, wherein the feedback information further includes a group of transmit beams that are with lowest interference to each receiver.

4. The MIMO communication system based on random beamforming of claim 1, wherein the feedback information includes a group of best transmit beams for each receiver, the equivalent channel gain of each transmit beam in this group, a group of transmit beams that are with lowest interference to each receiver and the degradation factors caused by each of them to the group of best transmit beams.

5. The MIMO communication system based on random beamforming of claim 1, wherein the MIMO scheduler includes:
   a receiving RF link group to transform the received feedback signal into the corresponding symbol stream;
   a MIMO receiving signal processor to implement space-time signal processing on the obtained symbol stream and to obtain the corresponding scheduling information; and
   a scheduler to control the signal processing of the data processor according to the scheduling information.

6. The MIMO communication system based on random beamforming of claim 1, wherein the beamformer is composed of a plurality of multipliers and adders, generates and transmits a plurality of transmission signals corresponding to the transmit beams.

7. The MIMO communication system based on random beamforming of claim 6, wherein the transmitting RF link group includes a plurality of parallel transmitting RF links, which respectively transform a plurality of transmission signals from the beamformer into the corresponding RF signals and every transmitting RF link includes a modulator, an up converter and a power amplifier, which are connected in serial.

8. The MIMO communication system based on random beamforming of claim 7, wherein the received signal processor includes:
   a receiving RF link group to demodulate and frequency convert the received RF signals and to obtain the corresponding symbol streams;
   a MIMO received signal processor to produce the corresponding feedback information of the user according to the symbol stream and to recover and output the user data; and
   the feedback information processor includes:
   a MIMO transmission signal processor to transform the feedback information of the user into the feedback signal;
   a transmitting RF link group to transform the feedback signals into the corresponding RF signals.

9. A user scheduling method of the MIMO communication system based on random beamforming, the method comprises:
   (a) the receiver producing the feedback information according to a channel fading condition between a transmitting antenna and a receiving antenna and feeds back the feedback information to the transmitting antenna;

(b) the transmitting antenna receiving the feedback information, producing the scheduling information according to the feedback information and scheduling a user according to the scheduling information;

wherein, the scheduling information includes the scheduled user, data streams that should be supported by each scheduled user and the transmit beam adopted by each data stream;

wherein the feedback information includes a group of the best transmit beams for each receiver and the signal-to-interference ratio corresponding to each transmit beam in the group of the best transmit beams;

wherein (b) includes:

1) setting the scheduled user set and the allocated transmit beam set to null;
2) comparing all the fed back SIRs and selecting the user with the maximum SIR to be added to the scheduled user set and adding the corresponding transmit beam to the allocated transmit beam set;
3) comparing all the fed back SIRs and selecting the user with the maximum SIR among the unscheduled users, if the selected user and the corresponding transmit beam not in the allocated transmit beam set, adding the user to the scheduled user set and the corresponding transmit beam to the allocated transmit beam set;
4) repeating step 3) until finishing user scheduling;
5) implementing user scheduling of the system according to the final scheduled user set and the allocated transmit beam set;

wherein the feedback information further includes a group of transmit beams that are with lowest interference to each receiver;

wherein (b) includes:

1) setting the scheduled user set and the allocated transmit beam set to null;
2) comparing all the fed back SIRs and selecting the user with the maximum SIR to be added to the scheduled user set and adding the corresponding transmit beam to the allocated transmit beam set;
3) finding the transmit beam with the minimum interference in the corresponding groups in response to the user in the scheduled user set and selecting the user with the maximum SIR according to the transmit beam to be added to the scheduled user set and at the same time, adding the corresponding transmit beam to the allocated transmit beam set;
4) repeating step 3) until finishing user scheduling; and
5) implementing user scheduling of the system according to the final scheduled user set and the allocated transmit beam set.

10. A user scheduling method of the MIMO communication system based on random beamforming, the method comprises:

(a) the receiver producing the feedback information according to the channel fading condition between a transmitting antenna and a receiving antenna and feeds back the feedback information to the transmitting antenna;

(b) transmitting antenna receiving the feedback information, producing the scheduling information according to the feedback information and scheduling a user according to the scheduling information;

wherein, the scheduling information includes the scheduled user, data streams that should be supported by each scheduled user and the transmit beam adopted by each data stream;

wherein the feedback information includes a group of the best transmit beams for each receiver and the signal-to-interference ratio corresponding to each transmit beam in the group of the best transmit beams;

wherein (b) includes:

1) setting the scheduled user set and the allocated transmit beam set to null;
2) comparing all the fed back SIRs and selecting the user with the maximum SIR to be added to the scheduled user set and adding the corresponding transmit beam to the allocated transmit beam set;
3) comparing all the fed back SIRs and selecting the user with the maximum SIR among the unscheduled users, if the selected user and the corresponding transmit beam not in the allocated transmit beam set, adding the user to the scheduled user set and the corresponding transmit beam to the allocated transmit beam set;
4) repeating step 3) until finishing user scheduling;
5) implementing user scheduling of the system according to the final scheduled user set and the allocated transmit beam set;

wherein the feedback information includes a group of best transmit beams for each receiver, the equivalent channel gain of each transmit beam in this group, a group of transmit beams that are with lowest interference to each receiver and the degradation factors caused by each of them to the group of best transmit beams;

wherein (b) includes:

1) setting the scheduled user set and the allocated transmit beam set to null;
2) comparing all the fed back equivalent channel gains and selecting the user with the maximum equivalent channel gain to be added to the scheduled user set and adding the corresponding transmit beam to the allocated transmit beam set;
3) finding the transmit beam with the minimum interference in the corresponding groups in response to the user in the scheduled user set and finding the user with the maximum equivalent channel gain corresponding to the transmit beam with the minimum interference;
4) judging whether the adding of the user has increased the system capacity according to the fed back degradation factors, if the adding of the user has increased the system capacity, adding the user to the scheduled user set and at the same time, adding the corresponding transmit beam to the allocated transmit beam set; if the adding of the user has reduced the system capacity, then not adding the user to the scheduled user set and ending scheduling;
5) after the adding of the user, repeating step 3) and 4) successively until the end of scheduling;
6) implementing user scheduling of the system according to the final scheduled user set and the allocated transmit beam set.

* * * * *